(12) United States Patent
Goodson et al.

(10) Patent No.: US 8,554,709 B2
(45) Date of Patent: Oct. 8, 2013

(54) ENTITY PERFORMANCE ANALYSIS ENGINES

(75) Inventors: Robert B. Goodson, San Francisco, CA (US); Eun Young Hwang, Buenos Aires (AR); Kirill Makharinsky, Buckinghamshire (GB); Sean William-Joseph Gourley, Christchurch (NZ)

(73) Assignee: Quid, Inc., San Francisco, CA (US)

( * ) Notice: Subject to any disclaimer, the term of this patent is extended or adjusted under 35 U.S.C. 154(b) by 732 days.

(21) Appl. No.: 12/535,579

(22) Filed: Aug. 4, 2009

(65) Prior Publication Data
US 2010/0030722 A1      Feb. 4, 2010

Related U.S. Application Data

(60) Provisional application No. 61/086,153, filed on Aug. 4, 2008.

(51) Int. Cl.
*G06F 17/00* (2006.01)
(52) U.S. Cl.
USPC .............................. 706/45; 705/7.11
(58) Field of Classification Search
USPC .......................... 706/45; 705/7.11
See application file for complete search history.

(56) References Cited

PUBLICATIONS

Wingyan Chung ("Designing Web-based Business Intelligence Systems: A Framework and Case Studies" 2006).*
Mothe et al ("Combining mining and visualization tools to discover the geographic structure of a domain" 2005).*
Deng et al ("An Exploratory Discuss of New Ways for Competitive Intelligence on WEB2.0" 2007).*
Finegold et la ("How to conduct competitive intelligence in your biotech startup" Jun. 2005).*
Sue Myburgh ("Competitive Intelligence" 2004).*
Chinese Office Action, Chinese Application No. 200980135742.2, Jan. 23, 2013, 11 pages.

* cited by examiner

*Primary Examiner* — Lut Wong
(74) *Attorney, Agent, or Firm* — Fenwick & West LLP

(57) ABSTRACT

A system and method for measuring a performance of an entity and for predicting its future performance is disclosed. Raw information about the entity is collected from internal and external sources. The information is cleaned to exclude false positives. Using performance categories, the information is organized and transformed into meaningful data for the performance analysis engine. The information is normalized by scaling the meaningful data by industry type. A performance score is calculated by the performance analysis engine based on the normalized data. Further, a competitive relationship score is calculated based on the performance score and the normalized data. These scores are reported in a user interface displaying the performance of the entity and are used as inputs, among other factors, to a predictive analysis engine that assesses the future performance of the entities.

9 Claims, 15 Drawing Sheets

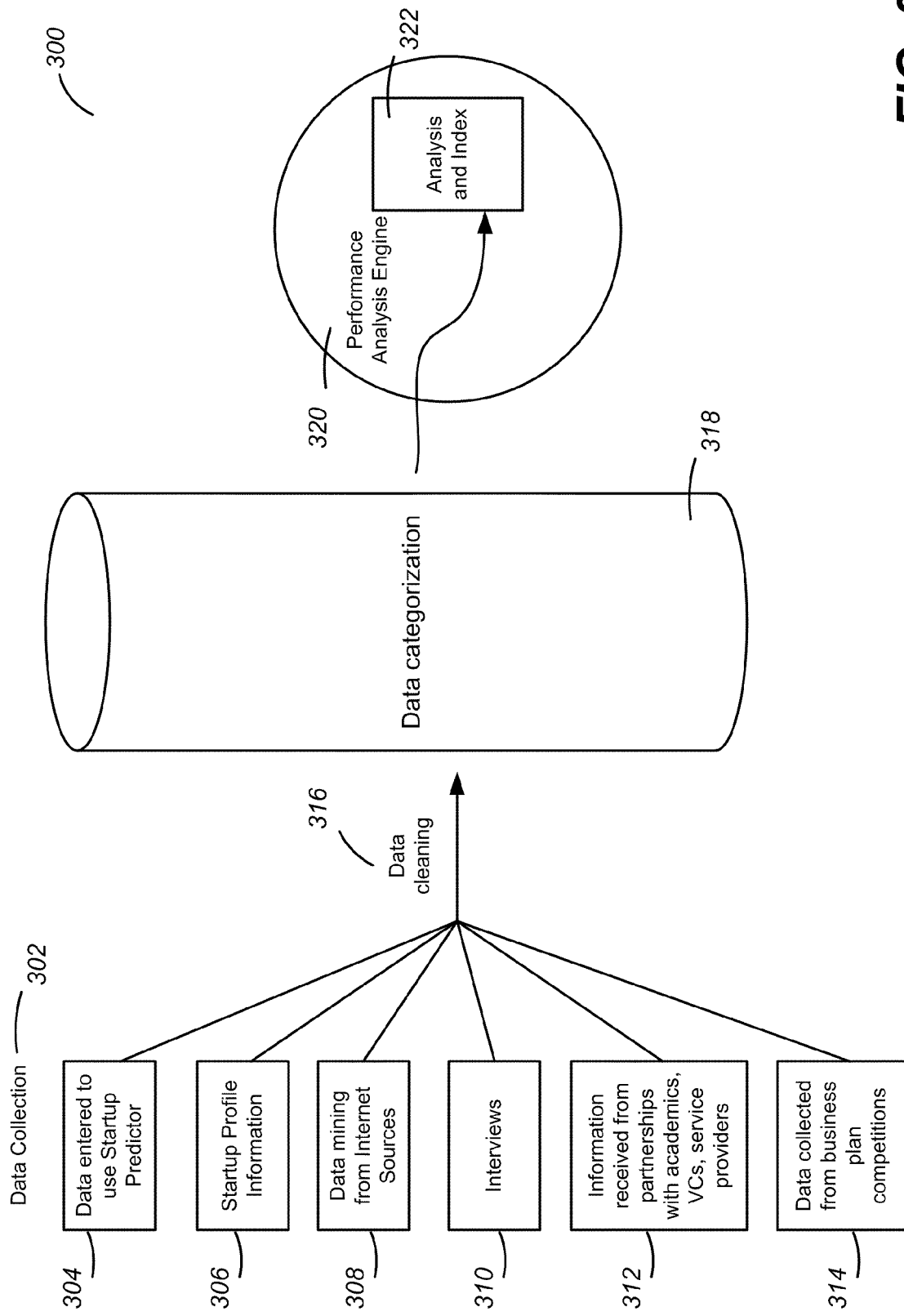

FIG. 7

Network construction

1102 — ① Collect news articles for companies

1104 — ② Match company names in articles with existing database

1106 — ③ Remove false positives from news

1108 — ④ Generate co-mention matrix centered around single company A (or multiple companies)

1110 — ⑤ Collect tagging information on each company

1112 — ⑥ Combine tagging information with co-mention information to construct initial relationship network for company A

*FIG. 11*

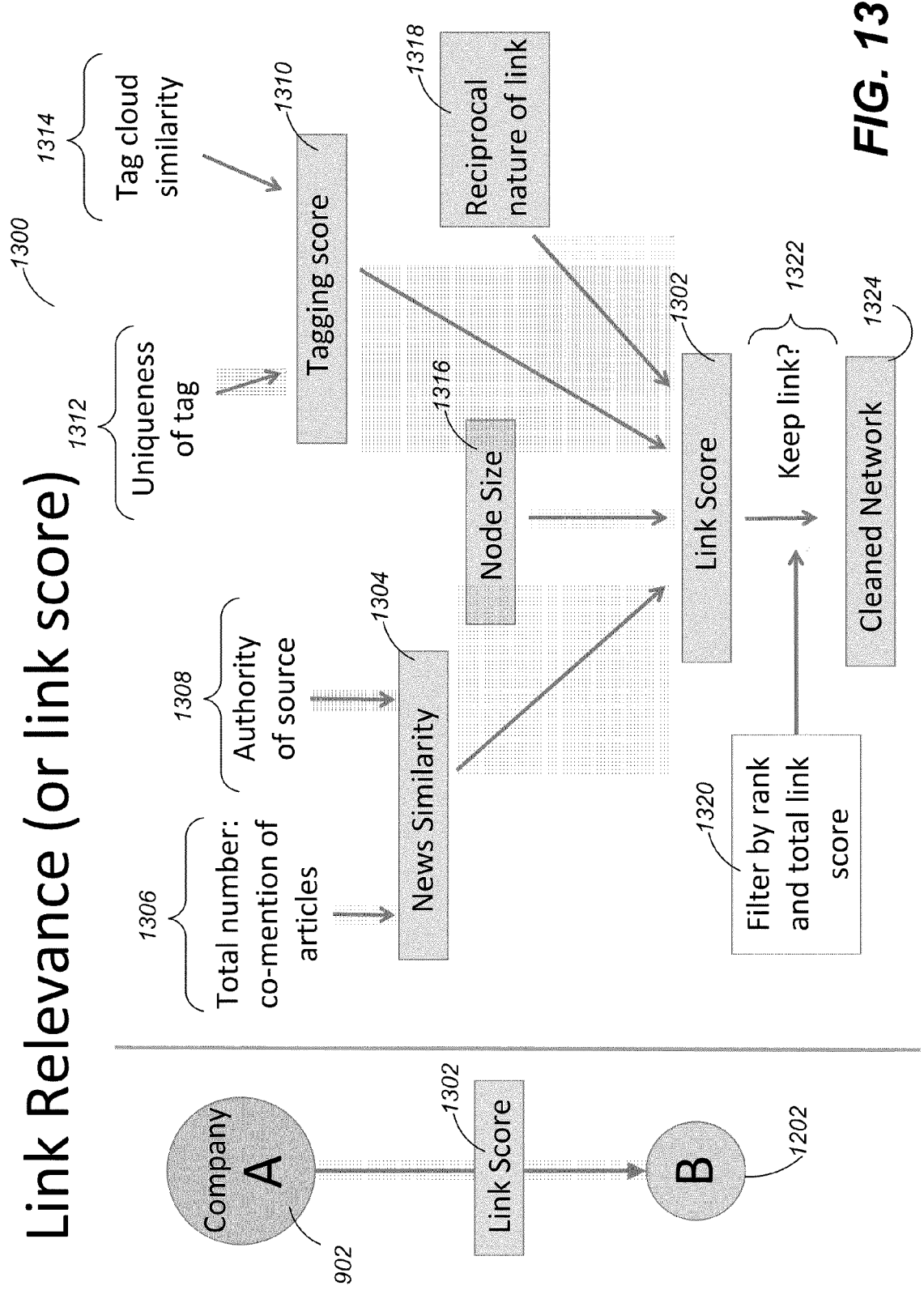

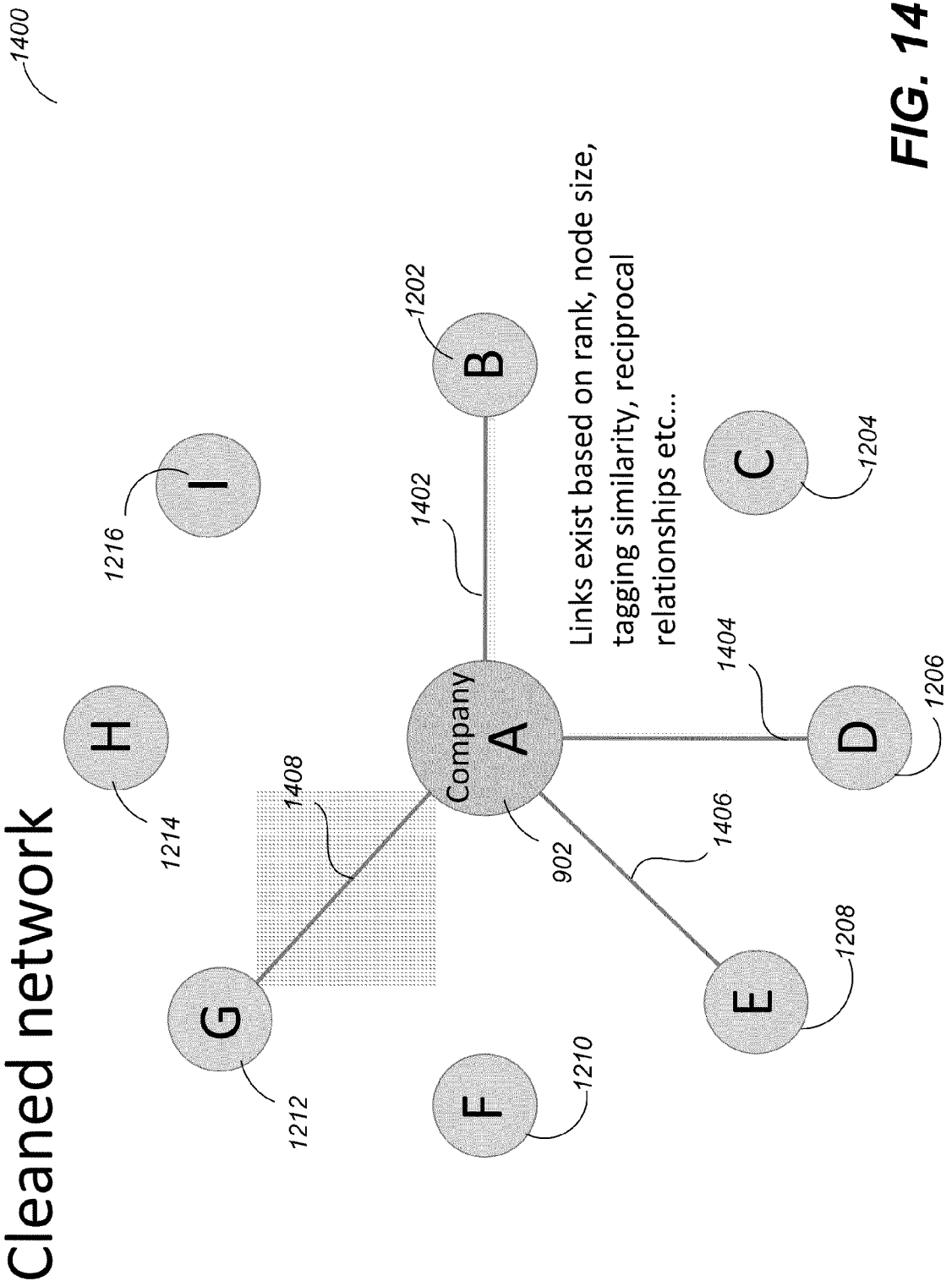

ENTITY PERFORMANCE ANALYSIS ENGINES

CROSS REFERENCE TO RELATED APPLICATION

This application claims the benefit of U.S. Provisional Application No. 61/086,153, filed Aug. 4, 2008, which is incorporated by reference in its entirety.

BACKGROUND

1. Field of Art

The disclosure generally relates to processes that collect information about entities, assess and predict the performance of entities, including public companies, non-profits, social enterprises, early and late stage 'startups,' and entire ecosystems.

2. Description of the Related Art

Over $67 billion in cash was invested in startups in 2007 in the United States alone. Currently, there are no reliable quantitative tools that can systematically and analytically inform these investment decisions. The development of such tools is difficult for three reasons: the inexistence of an exhaustive database with information about these entities, the lack of standardized methods to systematically evaluate any given startup's performance, and the lack of predictive algorithms and models to forecast the future performance of entities. Currently, there is no central repository of information that gathers facts about an entity's access to financial, social and human capital, related press and reviews, as well as the social dynamics of its founders and contributors. Moreover, tracking tools that systematically compute and monitor the performance of these entities over time are lacking. Therefore, determining the factors that affect the performance of entities empirically and analytically has until now been challenging. Without these factors and inputs, it has not been possible to develop predictive algorithms.

The aforementioned reasons explain why presently there are no predictive tools to quantitatively assess the risks and potential returns of any given entity, especially those that are private (e.g., startups). Similarly, there is a lack of a universal standardized scoring system that allows the systematic comparison of startups based on the same criteria. As a consequence, it is difficult to develop a normalized ranking for startup type entities. Currently, investors manually compare and perform risk-analyses on these startups based on limited data. The volume of information (i.e., the number of data points and the depth of data about each entity) accessible by any single individual or organization was not statistically relevant. Moreover, a single individual or entity did not have access to large datasets containing information corresponding to startups across different locations and industries in the world.

Current attempts at solving the problem of effectively gathering information for analysis are resource intensive, sporadic, and unsuccessful at reaching significant coverage. Tools such as conventional due diligence and decision-making guidelines are drawn from a limited number of sample points by humans. Therefore, this human bias contributes to the current existence of investment criteria that are wrongly focused on factors that are not empirically and statistically proven to influence the future performance of an entity such as an early-stage startup. An objective and universal analysis of the performance of entities, in general, is lacking.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG.) 1 illustrates one embodiment of components of an example machine able to read instructions from a machine-readable medium and execute them in a processor (or controller).

FIG. 3 illustrates one embodiment of a data flow for a startup predictor.

FIG. 7 illustrates one embodiment of a screenshot of a startup tracker application.

FIG. 11 describes one embodiment of a method of constructing an initial network of entities.

FIG. 13 illustrates one embodiment of a high-level block diagram of the types of information used to rank and filter the initial network of entities.

FIG. 14 illustrates one embodiment of a high-level block diagram of a cleaned network of entities.

DETAILED DESCRIPTION

Figure 1:
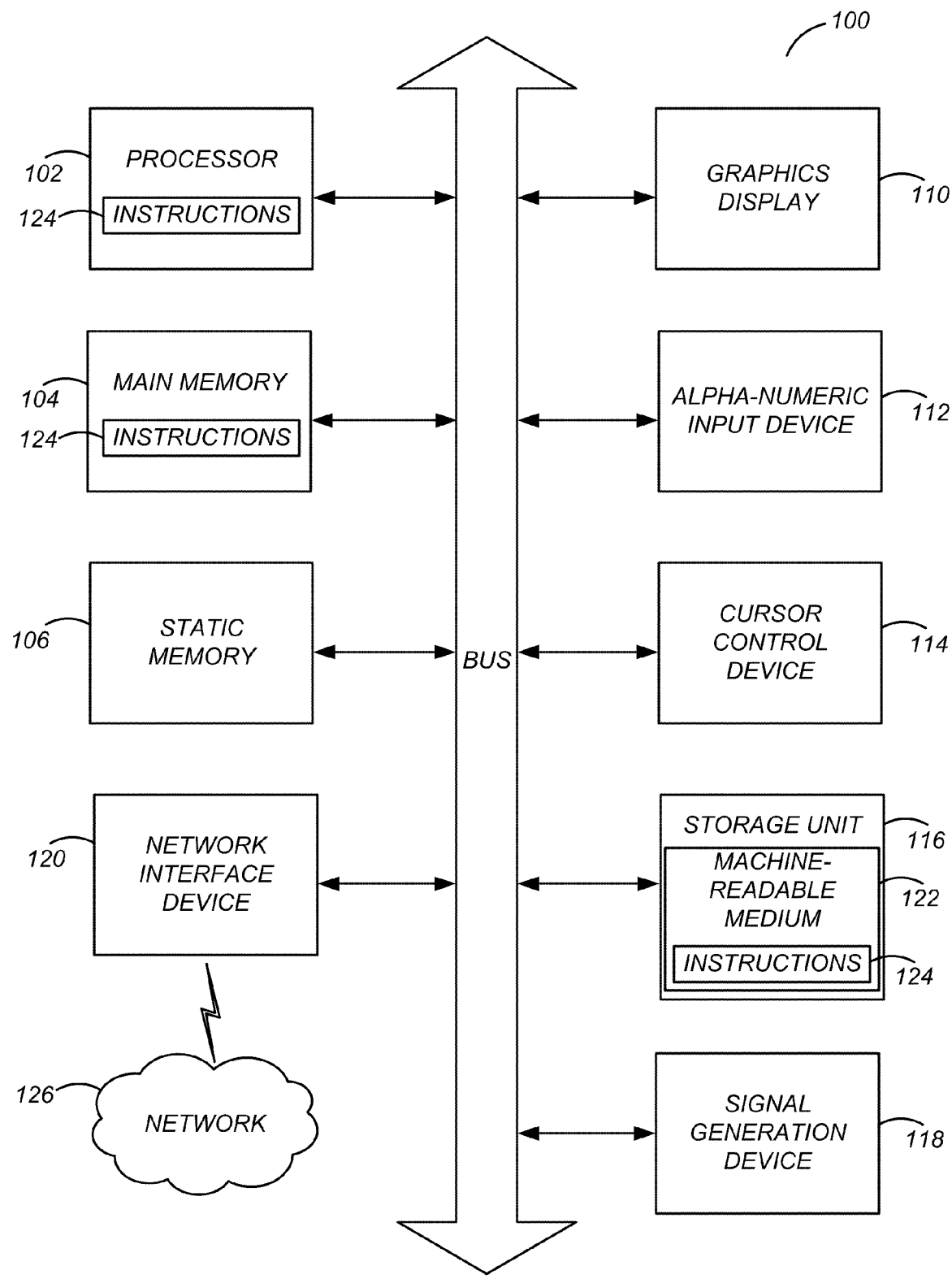

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

The first step to building a predictive model for startup type entities is to create a method to compute the performance of such entities through a standardized scoring system. Analyzing and assessing the performance of entities, as a general matter, involves collecting data about the entities, cleaning and filtering that data, analyzing the data according to performance categories, and reporting the results of the analysis in a meaningful way. As used herein, "entities" may comprise public companies, non-profits, social enterprises, early and late stage 'startups,' and even entire ecosystems. Throughout the specification, entities may be referred to as "startups," but one of skill in the art will recognize that the other entities mentioned above may be analyzed using similar methods to track their performance.

A configuration for assessing the performance of entities (e.g., early stage startups) comprises three components: data collection, data cleaning and filtering, analysis of the clean data, and reporting of results. Data collection includes retrieving data from internal sources, such as a social network platform that showcases entity profiles, and external sources including mainstream media and social media. Other information may also be collected, such as the entity's funding, traffic on the entity's website (or equivalent traffic in sales of widgets, for example), industry specific information (e.g., numbers of patents filed, regulatory agency compliance), and analyst modifications to the dataset. In order to assess the performance of an entity, this information must be cleaned and filtered to eliminate false positives (irrelevant information that may affect the performance assessment of the entity).

Once the clean data has been analyzed, the results are reported in a meaningful way to users. In one embodiment, users may also compare an entity against other entities in a competitive landscape map. Illustrating a network of the competitive entities and their connections (or links), the competitive landscape map is based on a relationship score (or link score) derived from the retrieved media articles mentioning at least one entity in relation to another entity. Using this information as one of many other inputs, a predictive model computing system may predict the future success of an entity, such as an early stage startup, and provide an estimated valuation of the entity at some point in the future.

In one embodiment, a method for measuring the performance of an entity includes collecting raw information about the entity from internal and external sources. The information is cleaned to exclude false positives. Using performance categories, the information is organized and transformed into meaningful data for the performance analysis engine. The information is normalized by scaling the meaningful data by industry type. A performance score is calculated by the performance analysis engine based on the normalized data. Further, a competitive relationship score is calculated based on the performance score and the normalized data. These scores are reported in a user interface displaying the performance of the entity.

In another embodiment, a system for measuring a performance of an entity includes a data collection module that gathers raw information about the entity from internal and external sources. A data cleaning module cleans the raw information to exclude false positives, while a data categorization module is configured to organize the information into performance categories. These performance categorizes may be pre-defined, or even created on the fly as new data is collected. A score is generated for each performance category based on the information collected about the entity. A data normalization module is used to scale the performance category scores according to the entity's industry type. For example, the biotech industry may place heavy weight on an industry-specific performance category such as passing FDA regulatory approval. Thus, the data normalization module would scale back other scores in response. A performance module calculates a performance score based on the normalized information. A competitive relationship module calculates a competitive relationship score based on the performance score and the normalized information. Finally the performance score and the competitive relationship score is reported by the reporting module.

By measuring all aspects of an entity's current performance (or cross-sectional snapshot) in a quantitative way (financial health, team robustness, positioning in the space/sector, efficiency, popularity, etc.), the performance scores of an entity over a time period are received to build historical data for the entity. Thus, a longitudinal record of a statistically significant database of entities enable the creation and continual modification of predictive models based on identified patterns of predictive indicators. Using the predictive indicators, the future performance of a particular entity may be predicted based on its current conformation, team composition, positioning in the space and overall performance. In one embodiment, a graph may report the progress of an entity over time and report the future performance of the entity. In another embodiment, the scores of several entities may be displayed in an index sorted by a ranking of the scores.

Computing Machine Architecture

FIG. (Figure) 1 is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 820, which also are configured to communicate via the bus 108.

The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Overview of Predictive Analysis of Entities Configuration

Figure 2A:
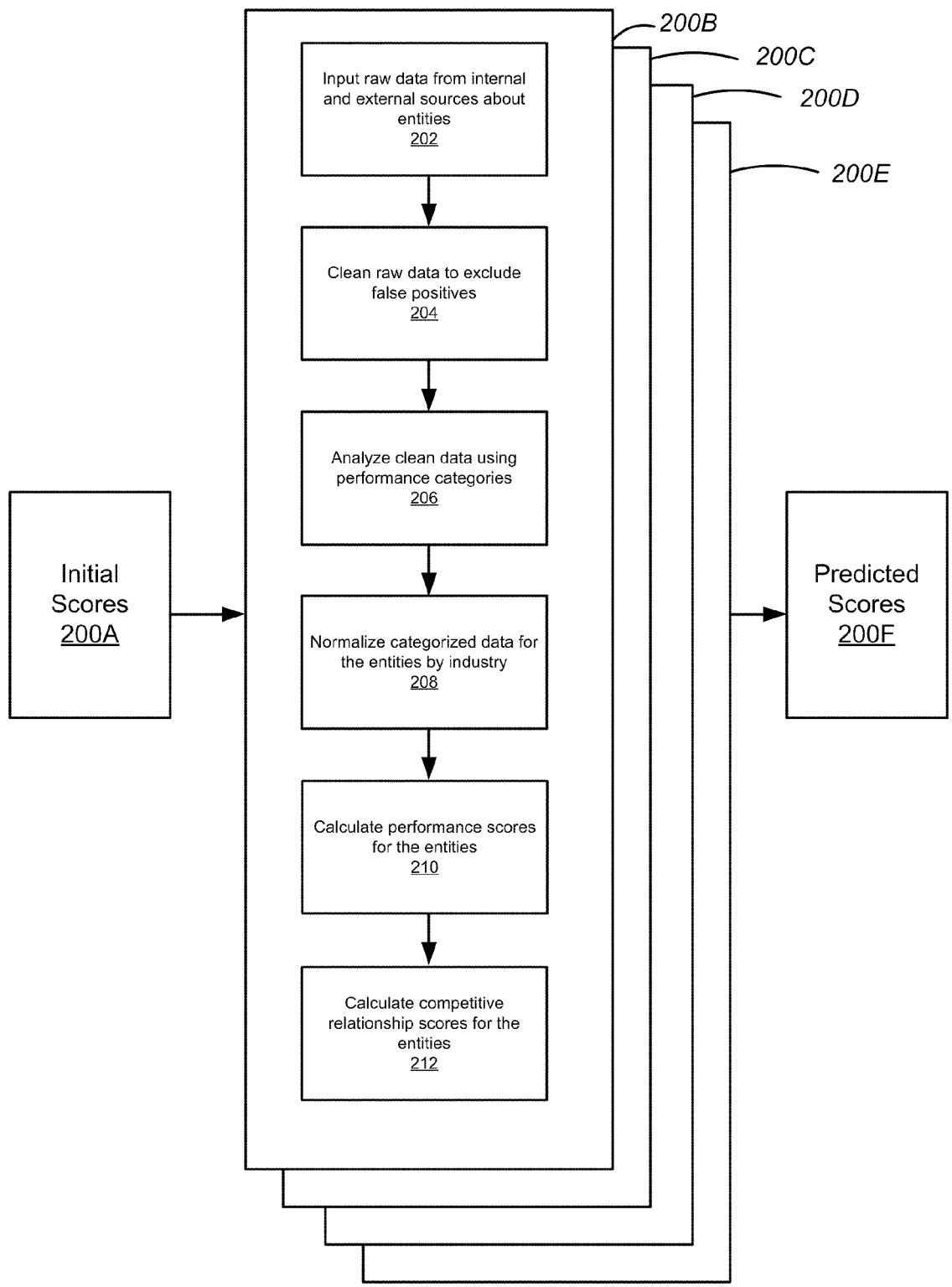
FIG. 2A illustrates a high-level flow chart illustrating an overview of the process of tracking the performance of entities over time to build a predictive model of entities.

FIG. 2A illustrates a high-level flow chart of the process of building a predictive model for entities by identifying key initial conditions and by tracking their performance over time. Initial scores of entities 200A may be inputted using previous knowledge of the entities. In one embodiment, the initial scores of entities 200A is zero. A performance tracker mechanism 200B-E and mechanism that computes predicted scores 200F may be implemented on a server computer in one embodiment. The mechanism 200B-E may be embodied as a software program (or software program product) comprising instructions (or algorithms) executable by a processor (or processing unit). Predicted scores 200F may similarly be embodied as a software program (or software program product) comprising instructions (or algorithms) executable by a processor (or processing unit). The instructions that are executable by a processor correspond to a process (or method).

A performance tracker 200B-E takes as input 202 raw data from internal and external sources about entities. The raw data is cleaned 204 to exclude false positives, or irrelevant raw data, by removing the false positives from the dataset based on cleaning criteria. The clean data is analyzed 206 by organizing the clean data into pre-defined, or pre-coded, performance categories. The categorized data is then normalized 208 by the type of industry of each entity because the factors that influence the performance of an entity vary across different industries. Performance scores may then be calculated 210 based on the normalized data. In addition, competitive relationship scores for entities may also be calculated 212 based on the normalized data and the calculated performance scores of related entities.

FIG. 2A illustrates four instances of the performance tracker 200B-E, but it will be apparent to one of skill in the art that many more iterations, over time, are possible. In one embodiment, another mechanism is used to compute predicted scores 200F using a predictive model that identifies patterns of performance indicators.

The entities being tracked by the performance tracker 200B-E represent real companies: companies that have building, people working on teams to produce products and services that affect the commerce of the real-world. News stories about these entities include information about events that are happening in the real-world. These news stories and other performance measures are gathered, analyzed, and transformed into meaningful information that is reported and displayed to users of the performance tracker 200B-E. In this way, a user may visually track the performance of multiple entities and even compare the transformed information against other entities in the competitive landscape. In one embodiment, the transformed information is displayed along side the predicted scores 200F. The future performance of entities, can thus be visualized by graphing the predicted scores 200F.

Data Collection Configuration

Figure 2B:
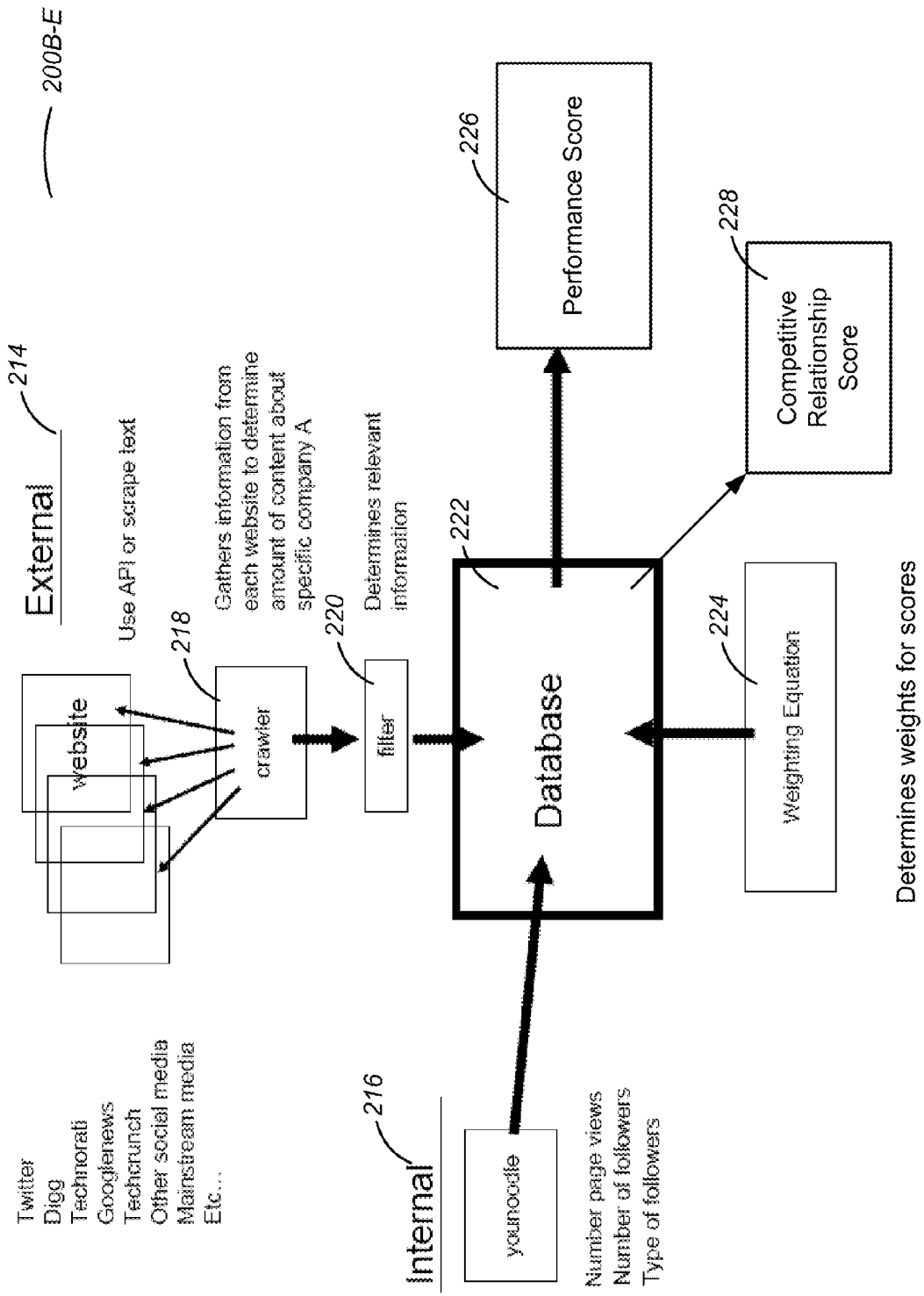
FIG. 2B illustrates one embodiment of a performance tracker mechanism.

Referring now to FIG. 2B, illustrated is one embodiment of a performance tracker mechanism 200B-E. In the present embodiment, the performance tracker comprises a process that is used to compute a 'Performance Score' 226 for a startup.

External data 214 on the startup is gathered 218 about the startup from news, social media and social network sites. Social media include more informal news sources 214 that are shared by individuals, such as TWITTER and DIGG. Traditional media may include such external news sources 214 like THE NEW YORK TIMES and NEWSWEEK. Content analysis is performed by a filter 220 on this information to determine its relevance for the 'Performance Tracker' algorithm. Proprietary information gathered from internal sources 216 are coupled with the externally crawled information 214 using a weighting equation 224, and a performance score for the entity 226 is calculated and stored in a database 222. Additionally, a competitive relationship score 228 is also calculated using the same internal 216 and external 214 data. The performance score 226 feeds into the process as one of the variables taken into consideration for the prediction of the startup's potential success. It can also be used as an independent score for startups to assess their level of popularity and current performance.

The performance tracker 200B-E is configured to collect data from a range of Internet sources, both internal 216 and external 214, to assess how people are responding to the startup. For each time the startup is mentioned (a 'Comment') in one of the sources monitored, a score is given for: (1) trust level of the source (measured by inbound links, existing trust metrics, e.g., TECHNORATI's 'Authority' score, etc.); (2) how positive the context of the Comment is (using analysis of keywords, presence of emoticons, etc.); (3) how long ago the comment was posted. Furthermore each of the sources is weighted differently (e.g., a comment on DIGG is weighted differently to a comment on TWITTER). By applying the weighting equation 224 the attributes of the Comments for a particular startup and combining the data collected internally from internal success predictor platform describing how users are responding to the startup (e.g., 'following' patterns (users who sign up to receive a newsfeed from the startup are 'following' the startup), page views, professional background of the users that are interacting with the startup, etc.), the performance tracker 200B-E may determine a performance score 226 and a competitive relationship score 228, each of which are further described below. These scores are then stored in the database 222 for use by applications that report the scores in a meaningful way to users.

FIG. 3 illustrates one embodiment of a data flow for a startup predictor that utilizes a predictive model to assess the future performance of entities. Specifically, it illustrates a summary of the data collection methodology 302 and a diagram of the way the data is fed into the predictive process. After the data is collected 302, the data is cleaned 316 and categorized 318. Using a performance analysis engine 320, the information about a particular entity is analyzed and indexed 322.

A predictive model computing system utilizes various methods of collecting information about entities. Data entered into the startup predictor 304 is responsive to a series of questions that have been identified as relevant to the future performance of an entity. Data may also be collected from the profile information 306 entered by the entity. As already mentioned above, data can also be mined 308 from Internet Sources such as ALEXA. Interviews 310 may also be conducted to gather more information. Strategic partnerships with relevant groups (e.g. academic partners, venture capitalists (VCs), and service providers (e.g., accountants, consultants, lawyers, etc.)) may also result in gathering more specific data 312 on entities, such as early stage startups. Further, business plan competitions provide another source of data 314 about such entities.

The data collected 302 through all aforementioned means includes, but is not limited to, the following variables: Valuation (after a pre-defined number of years) of previous companies founded by each team member; Number of years in full-time higher education for each team member; Number of years working full-time in the relevant industry for each team member; Number of years working full-time on the companies founded by each team member; Amount of time spent on the startup for each team member; Valuation aim of the startup (for a pre-defined number of years after start date); Full entrepreneurial track record of each team member; Full work history of each team member; Social graph of team and each team member; performance level of startup (according to internet sources), measured by the performance tracker 200B-E; Funding and valuation changes over time to date; Revenue activity to date; and Industry.

Cleaning and Filtering Data Configuration

The filtering 208 of data illustrated in FIG. 2 is described further. Data cleaning 316 is needed because media articles retrieved by crawlers 206 may contain irrelevant data. For example, entities may be mentioned in media articles with other more famous entities even where the co-mentioned famous entities are not really related. This may be described as "noise" because the data needed, such as information about an early-stage startup, also includes extraneous information that potentially dilutes the value of the information stored in the database 210. This "noise" may also be described as a "false positive" because the extraneous data may increase a performance score of an entity that is not related to the media article, such as a user of a social networking website posting an article on his blog. In that case, the social networking website being used as a platform to host the article is not substantively related to the article. Thus, a filter 210 may be configured to eliminate this situation from affecting the data collection.

Relevant information may be obtained by filtering this "noise" or these "false positives." In one embodiment, the filter 210 may contain certain keywords, or modifiers, that eliminate these false positives. In another embodiment, a long list of entities in one media article may indicate that the entities only mentioned once are "noise" and not substantively related to the entity described in the article. In yet another embodiment, an entity is authenticated against known entities stored in a database by an identifier, such as the unique URL of the entity's website or the entity's name. In further embodiments, certain names that appear frequently, yet constitute "noise," may categorically be eliminated. In other embodiments, certain phrases such as "Digg" or "Check me out on myspace" may be discounted or even categorically excluded from the data set. In another embodiment, articles retrieved from Internet Sources may be filtered by their URL structure to identify false positives, such as "youtube/watch" of a URL string. Finally, manual identification and cleaning of the data collection further cleans the data set. Using these various cleaning methods, a cleaning module of the performance tracker cleans 316 the dataset so that it is concentrated with respect to relevancy.

Data Categorization and Entity Performance Analysis

Data categorization 318 is the process of taking raw data and organizing it into quantifiable pieces of information. As a matter of design choice, data may be sorted and organized into a hierarchy of predefined categorizations. In this way, data is "pre-coded" and prepared for analysis using various conversion processes. The conversion processes transform the hodgepodge of data retrieved from external and internal sources, such as mainstream news stories, blog entries, microblog entries, social network analyses, new funding, new hires, etc., into pre-coded categories of data that can be used by the performance tracker 200B-E to quantify the effect of the news event on the performance of the particular entity.

As an example of a conversion process, the information entered into a startup's profile may include the college or university where team members studied, and in some cases, graduated. The names of universities may be simply coded as 1, 2, 3 based on whether the university is ranked top 5% (1), 25% (2) or lower than 25% (3). Another example of pre-coding would be to assign a code for the industry that the startup belongs to (e.g. Consumer Internet=101101, Biotech=161616). Each of these codes may be organized into a hierarchy and given various weights when the data is received from various sources. For example, a mainstream media article may receive full credit, where a social media article may only receive 50% credit.

Figure 4:
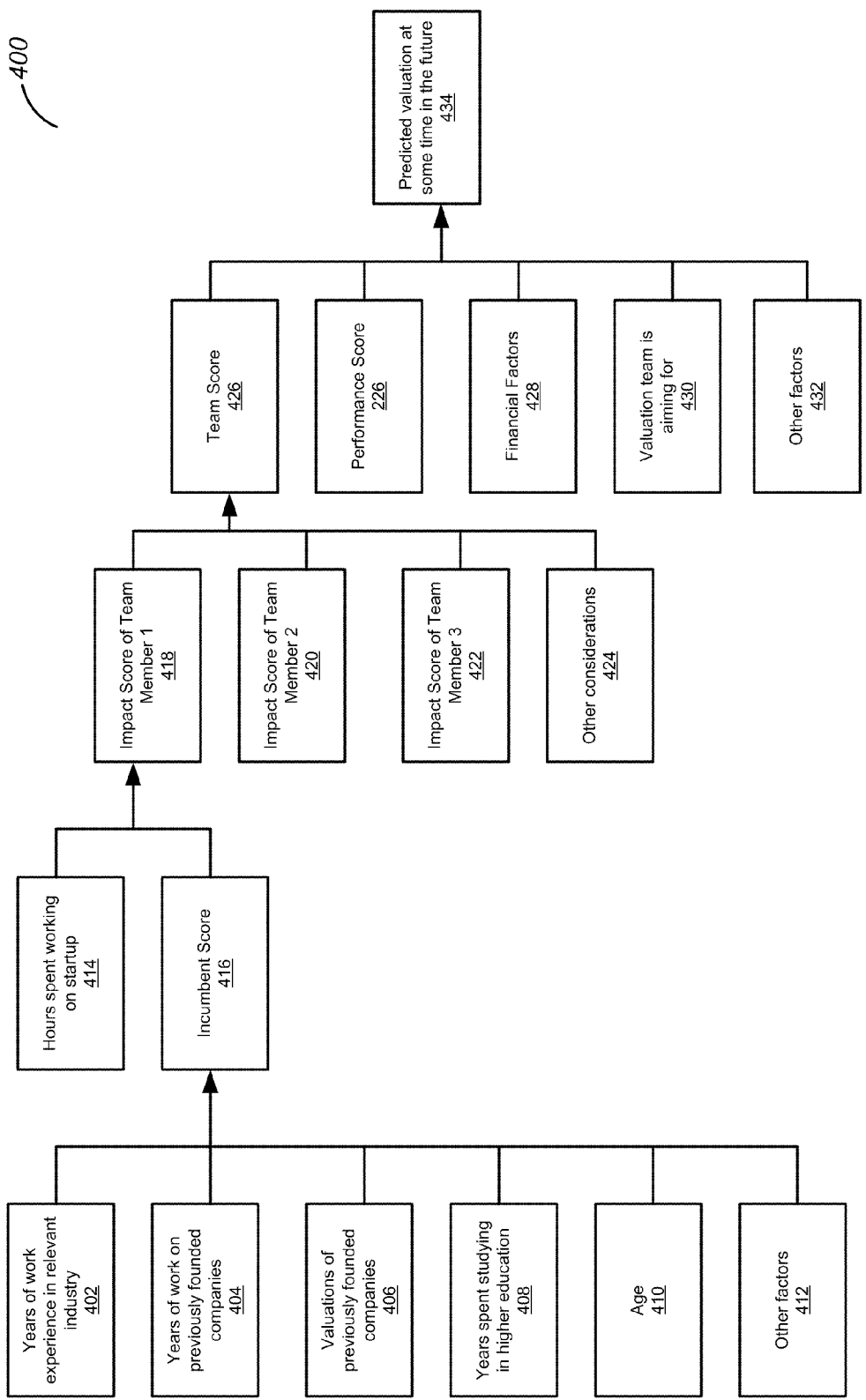
FIG. 4 illustrates one embodiment of a data flow for an analysis engine within a startup predictor.

Pre-coded data may be hierarchical in other ways. A calculation of the "Incumbent Score," an intermediary score for a team member described in more detail in FIG. 4, is another pre-coding step because the data retrieved about individuals, such as their past educational history, past friendship with other team members, past performance in startups, etc., is aggregated and converted into incumbent scores. This data is hierarchical because, as explained below, the incumbent scores are then fed into impact scores which, in turn, are then fed into team scores. Overall, the received information about entities is eventually converted into one or more of the following categories of scores: media score (media mentions (social and mainstream), traffic, funding (cash), and number of employees. The analysis and conversion of these category scores into a performance score is discussed in depth below.

Continuing with FIG. 3, however, a performance analysis engine 320 and analysis and index 322 are used to determine the performance of a particular entity. After the received information has been filtered, cleaned, and categorized, a performance score may be determined by applying an algorithm to the categorized data. Variables are combined in a step by step process. The parameters and weights will vary by industry. Further, the analysis is slightly different for public companies as compared to private companies because of the type of information available (e.g., stock market capitalization information is available for publicly traded companies, but cash reserves may not be available for private companies). However, the categorizations of information remain the same for all types of entities: cash, traffic, news, industry specific components, and analyst modifications.

For private entities, the cash score is derived from the total funding raised to date, number of full time employees of the company (or full time equivalent employees), and the estimated annual revenue of the private entity. For public companies, the Stock Market Capitalization is used as the cash score.

A traffic score may be computed by aggregating the data retrieved from various sources. The entity's website traffic may be obtained from third party vendors, such as ALEXA, COMPETE, and QUANTCAST. Other website traffic data may include traffic to CRUNCHBASE profile pages, internal website page views and followers, and organic search referrals. In the event that an entity does not have a website or has other means of judging the entity's productivity (such as the number of software downloads or application usage), traffic equivalents are generated to convert such data into a traffic score. Furthermore, the traffic score may be scaled depending on the industry of the entity (e.g., a thousand views for a website may not mean much for a platform type entity, but it may mean a lot more to a niche market startup entity).

News, comprising media articles, is also retrieved from various sources that are combined to calculate a media score for a particular entity. The news sources range from traditional mainstream media, such as THE NEW YORK TIMES and CNET, to social media, such as blogs, messaging, and social networking websites. In one embodiment, the media score is weighted by the type of news source. In another embodiment, social media articles receive half the credit accorded to mainstream media articles. The news components are then combined using a weighted average of the retrieved news articles based on news source.

Because news has an expiration date (meaning that old news is less valuable than more recent news), a time decay factor is applied to each media article. Thus, each news source is logarithmically transformed into an individual score. This will be averaged over a certain time frame (e.g., a 40 day window), over which the media score for that particular article will decay.

Industry specific information may also affect an entity's performance score. For example, in the biotech industry, certain information has been identified as indicators of high performing entities: the number of patents, the number and phase of clinical trials, and FDA regulatory approval. Other industry specific information may include major events (as identified by an analyst or other mechanism), certification for cleantech companies, and SBIR grants (provided for innovative research).

Analyst modifications represent another input into an entity's performance score. An analyst may boost the final score based on the information retrieved about a particular entity. An analyst may also enter key events to give small boosts. Furthermore, an analyst may edit the traffic value or modify the industry of the entity to change the scaling of the traffic score. In one embodiment, an analyst is an automated agent of the performance tracker 200B-E.

After the retrieved information is properly categorized as traffic, cash, news, industry specific, and/or analyst modifications, a baseline score is computed. A baseline score represents a score over a longer time scale and incorporates the team score (described below). The baseline score may change slowly over time, but it is not expected to change quickly. First, the traffic score (T) and the cash score (C) are combined (TC) using a particular formula:

$$TC=T+C*[a_1-(a_2-b)T]/a_3$$

where $a_1$, $a_2$, and $a_3$ represent adjustable parameters. Adjustable parameter b is a coefficient that is calculated by using empirical and historical data to optimize the correlation between the resulting performance score and empirical data (i.e., the predicted valuation of a company versus its real valuation). Parameters are thus adjustable to account for new information received as indicators of good performance. This formula indicates that the traffic score forms the basis of the scores, and that the cash score may add boosts on top of this.

Example parameters $a_1=0.75$, $a_2=0$, and $a_3=1.3$. Contribution from cash scales from 0.75 to 0 as traffic increases from 0 and reaches 1.3.

Next, the news (N) is brought into the baseline score:

$$TCN=b_1*TFE+N*[b_2-(b_2-1-b_1)TFE]/b_3$$

where TFE is Traffic/Funding (TC above) and $b_1$, $b_2$, and $b_3$ represent adjustable parameters. Example parameters $b_1=0.8$, $b_2=0.4$, and $b_3=1.3$. Traffic/funding takes 0.8 of the total of the combined score, and news can add between 0.4 and 0.2 as traffic/funding scales from 0 to 1.3.

The final baseline score (SB) is computed by adding in industry specific information and adding on analyst modifications.

$$S_B=c_1*TFEN+c_2*I+A$$

where TFEN is Traffic/Funding and News (TCN above) and $c_1$ and $c_2$ represent adjustable parameters. Example parameters $c_1=0.9$, $c_2=0.1$ so that the score is weighted towards traffic/funding/news component.

Next a variable score is created to account for more recently retrieved information. The variable score comprises of a traffic score ($T_V$) using a smaller time frame (e.g., 10 day rolling averages), a news score ($N_V$) using shorter half lives, and new hiring information ($H_V$) (using a half life decay from the date job was posted). Note that the half life function could be replaced with a smoother curve. Other variable score components include changes in the number of followers on the internal website (and other types of social graph information). A simple combination function is used to calculate the variable score ($S_V$):

$$S_V=d_1*T_V+d_2*N_V+d_3*H_V$$

where $d_1$, $d_2$ and $d_3$ represent adjustable parameters.

Finally, the performance score is determined by combining the baseline and variable scores as a weighted average. A large percentage, for example 85%, of the final performance score is attributed to the baseline score. The remainder of the performance score is the variable score. In one embodiment, the performance score also comprises the team score (described below) that measures the potential of the team based on the team members' past history, prior social interactions with each other, friendships, and other information retrieved about the team.

Performance scores may vary by industry. Certain factors, described above, may be tailored to specific industries. A traffic score can be rescaled for different industries to reflect the value of traffic in different sectors. The rescaling can either be designed by developing a new scaling for the traffic score from the distribution of traffic levels in the different sectors, or by some design consideration of the relative value of the traffic. As an example, traffic is more valuable for software companies because it is likely to lead to a sale, whereas consumer internet traffic is less valuable because the revenue generated may be small per click. Thus, the traffic score may be scaled accordingly. Furthermore, weights and parameter values can be specified by industry and industry specific components may be given more or less weight according to the industry type.

One should note that in one embodiment the range of performance scores may not be capped at 100, but most entities have a performance score from 0 to 100 points. The ranges of scores correlate to a company's valuation using a monotonically increasing function. For example, a score of 100 points may imply a valuation of X (e.g. $200M) while a score of 20 points implies a valuation smaller than X (e.g. $1M).

Predictive Entity Analysis

FIG. 4 illustrates one embodiment of a data flow for an analysis engine 400 within a startup predictor. This analysis may be mathematically based, for example, linear, exponential, delta function or modified delta function, Gaussian, log normal or power law. It is noted that the chart provides a sampling of the analysis performed on the data and additional analysis can be applied when appropriate. In one embodiment a predetermined number of regressions are processed to find patterns of variables that have influence on startups' success. The data on a startup is analyzed to identify to what extent the startup fits the patterns of a successful startup. Patterns for success were identified by performing analysis (i.e. pattern recognition) of historical data collected. The number and type of patterns may vary as more data is collected. The model is refined and iterated by comparing empirical data (e.g., what actually happens to the startup) versus the valuation prediction. It is noted that this regression analysis may be used with the social network analysis described below. Furthermore, future performance measures can be expressed in values other than valuation (e.g. 'impact').

As illustrated in FIG. 4, numerous factors are combined, using exponential and tangential translations (among other mathematical formulas), to determine an "Incumbent Score" 416 for a particular member of the team. These factors include, but are not limited to, the years of work experience in the relevant industry 402, years of work on previously founded companies 404, valuations of previously founded companies 406, years spent studying in higher education 408, age 410, and other factors 412. Such other factors 412 may include the starting salary of the CEO, a number of granted options to the executive management team members, whether and which team members dropped out of college (and if so, which college), degrees obtained, past salary history, and other responses to questions posed when the entity profile information is entered. This type of information may be considered "human capital" information.

The incumbent score 416 is offset by the hourly contribution of that team member 414 to generate an impact score 418. The impact score, a numerical value between 0 and 1, is computed for each team member. Finally, a team score 426, a numerical value between 0 and 1, is calculated as a result of a formula which combines the 'Impact Scores' of all team members 420 & 422 and other considerations 424. Such considerations 424 include, but are not limited to, variables that are dependent on the number of team members and the number of advisors to the team.

The team score 426 and the performance score 226 are then combined with other factors and information, such as financial factors 428 (i.e., how much funding the entity has), the valuation that the team is aiming for 430, and other factors 432. Such other factors 432 may include an industry boost, a region boost, a URL length boost, and a URL domain boost. These other factors comprise variable design features that may change with time. The algorithm includes, but is not limited to, use of power and exponential translations. The scores and factors are fed into this model which outputs 'The Predicted Valuation' 434, which gives the predicted valuation, in dollars, of the startup, for a given timescale in the future. In one embodiment, other types of impact, aside from the predicted valuation in dollars, may be predicted using the same scores and factors described above, including press impact, social impact, environmental impact, market penetration, and the like. These types of performance measurement regarding the future may also be predicted using the above-mentioned factors and scores.

Social Analysis

Figure 5:
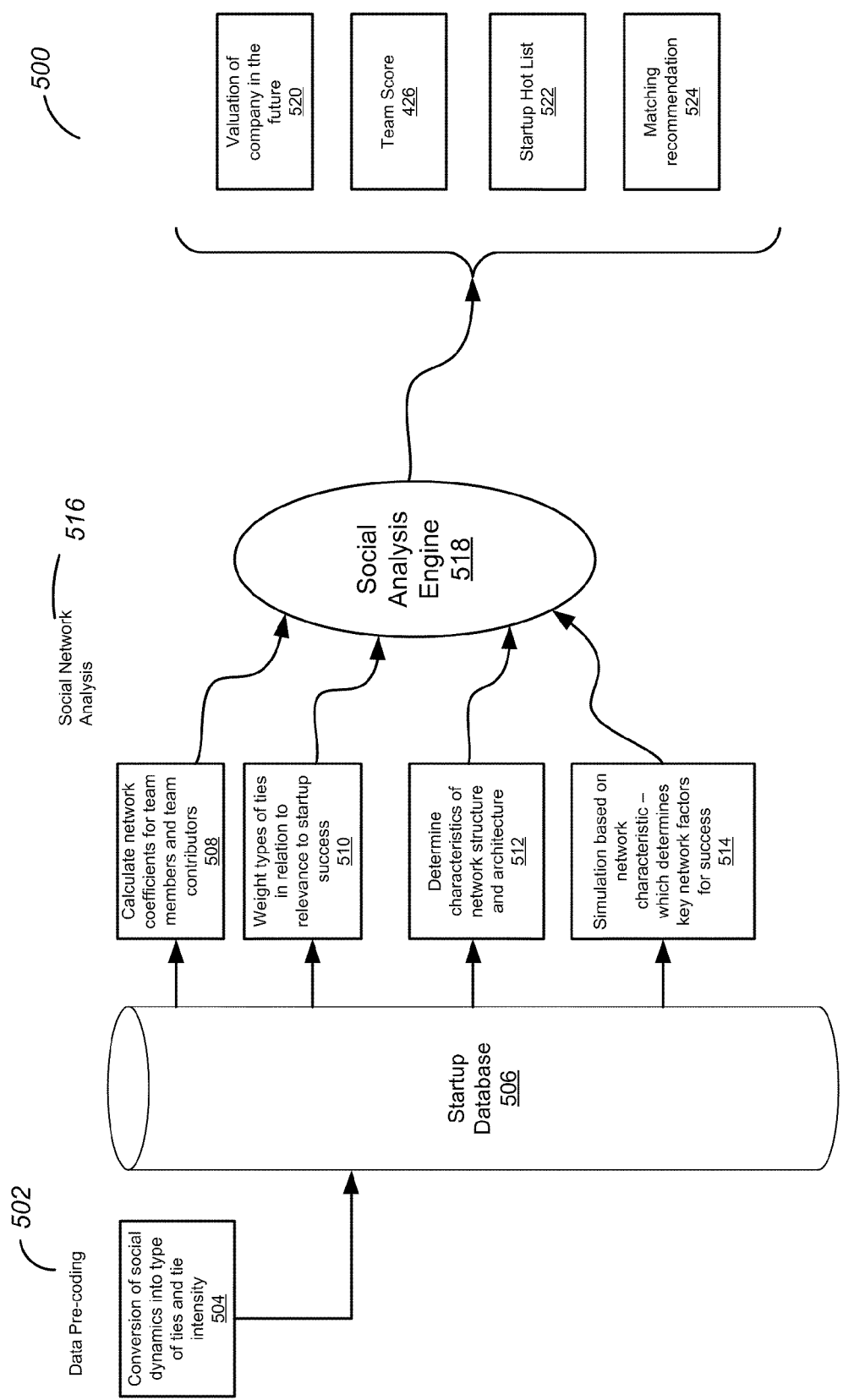
FIG. 5 illustrates one embodiment of a data flow for a social network analysis engine within a startup predictor.

Referring now to FIG. 5, a high-level block diagram of one embodiment of a social network analysis mechanism 500 is illustrated. Data pre-coding 502 involves the conversion of social dynamics into type of ties and tie intensity 504. This pre-coded information is then stored in a startup database 506. From the startup database 506, social network analysis 516 may be performed by calculating network coefficients for team members and team contributors 508, weighting the types of ties in relation to their relevance to the success of the startup 510, determining characteristics of network structure and architecture 512, and performing a simulation based on network characteristic-determining key network factors for success 514. A social analysis engine 518 may be applied to gather and aggregate social network information, as filtered by the abovementioned functions, to be incorporated as a factor in calculating other scores, such as the valuation of the company in the future 520, the team score 426, a startup hot list 522, and a matching recommendation 524.

As described above, a social network platform for entities, such as early stage startups, is used to collect data about the entities as well as provide tools to help the entity organize itself, opportunities to be showcased to investors, as well as a tool to predict the entity's valuation in the future. The social network platform may observe interactions between users, such as following other entities, and may convert such behavior into tangible information about the social network of users. This conversion of social dynamics 504 identifies type of ties (connections between users) and tie intensity (strength of the connection as a qualitative measure or a numerical value). As users continue to use the social network platform, the behaviors on the platform are recorded and strengthen (or weaken) the tie intensity. These behavior metrics are then stored in the startup database 506.

Based on the data in the startup database 506, the network coefficients for team members and team contributors may be calculated 508. Analysis of the network coefficients may indicate that certain ties between team members and team contributors deserve more weight 510 in relation to the startup's success. Further, characteristics of successful entities and their team members may be determined 512 in order to simulate a network characteristic to determine the key network factors for success 514. A social analysis engine 518 may then draw upon these indicators and apply them to entities in order to determine how the social network analysis may affect other scores: as a factor in computing the valuation of the company in the future 520, as another factor in determining the team score 426 of an entity, as a metric in ranking a startup hot list 522, and as an indicator in making a matching recommendation 524. In this way, the social network analysis of a particular entity enhances many different aspects of the performance of the entity.

Applications of Performance Analysis of Entities

Figure 6:
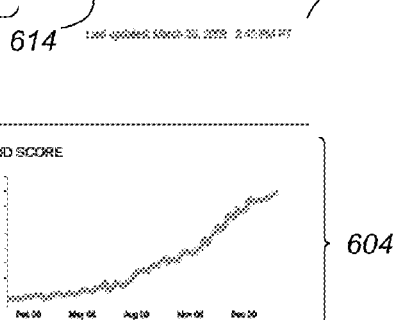
FIG. 6 illustrates one embodiment of a screenshot of profile information for a startup.
Figure 7:
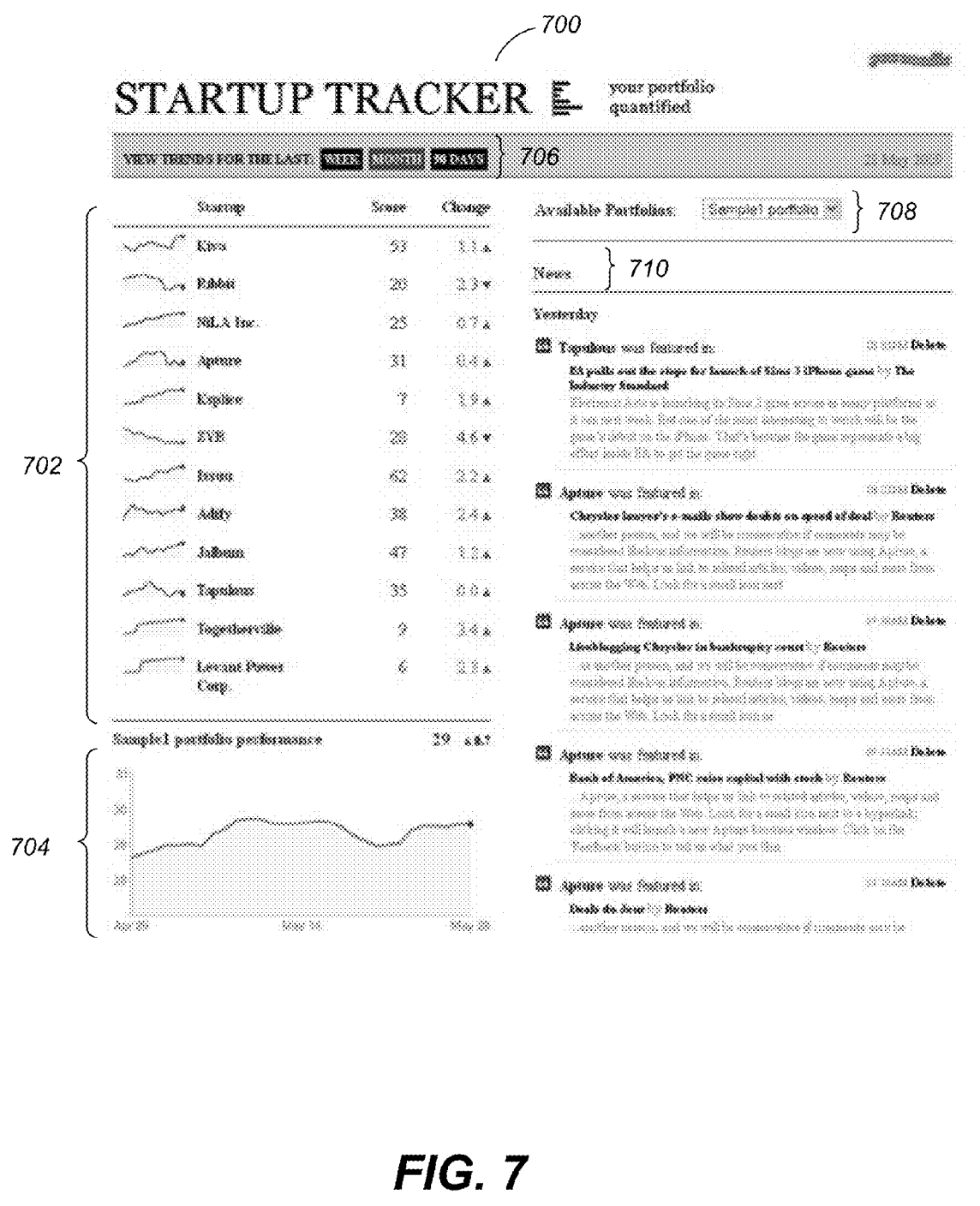

FIGS. 6-7 depict embodiments of applications of the performance analysis of entities, both current and future. In FIG. 6, a screenshot of an entity's profile 600 is illustrated. The profile 600 includes access to the collected data and analysis of the data as described above. The basic profile information 602 describes key facts about the entity, while a chart of the performance score 604 is also concurrently displayed. Further, related entities 606 are displayed to give the user a sense of the entity's competitive landscape. News articles from mainstream media 608 are displayed as well as social media articles 610. The user may navigate the website using tabs 612 or a search bar 614.

FIG. 6 brings together, on one screen profile 600, various types of data that would be useful for many types of users. The basic profile information 602 enables the user to quickly understand the business plan of the entity, while the performance score chart 604 depicts the entity's progress towards that business plan. Further, the user may quickly glance at related entities 606 to get a feel for the competition. Finally, recent news articles in mainstream media 608 as well as social media 610 enable the user to quickly get up to speed as to the entity's current performance. If the user wishes to find or browse other entities, the navigation tabs 612 and the search bar 614 provide easy access to other entities.

FIG. 7 illustrates a snapshot of an application that aggregates several entities onto one screen 700, called a startup tracker according to one embodiment. Smaller versions of the performance score charts 702 are displayed for the entities being followed. Additionally, the score and the change in the score is displayed next to the charts 702. Because the startup tracker 700 is designed for portfolio management, a separate portfolio performance chart 704 is generated. The user may wish to view trends over different timeframes and may select among various timeframes 706. Multiple portfolios may be managed using the startup tracker 700. In order to navigate from one portfolio to another, the user may select from a menu 708 which portfolio to view. Finally, the startup tracker 700 also provides the user with the most recent news articles 710 that feature entities within the portfolio. As a result, the user may quickly browse the most recent news about the performance (or underperformance) of the entities within the portfolio.

Competitive Landscape Map

Figure 8:
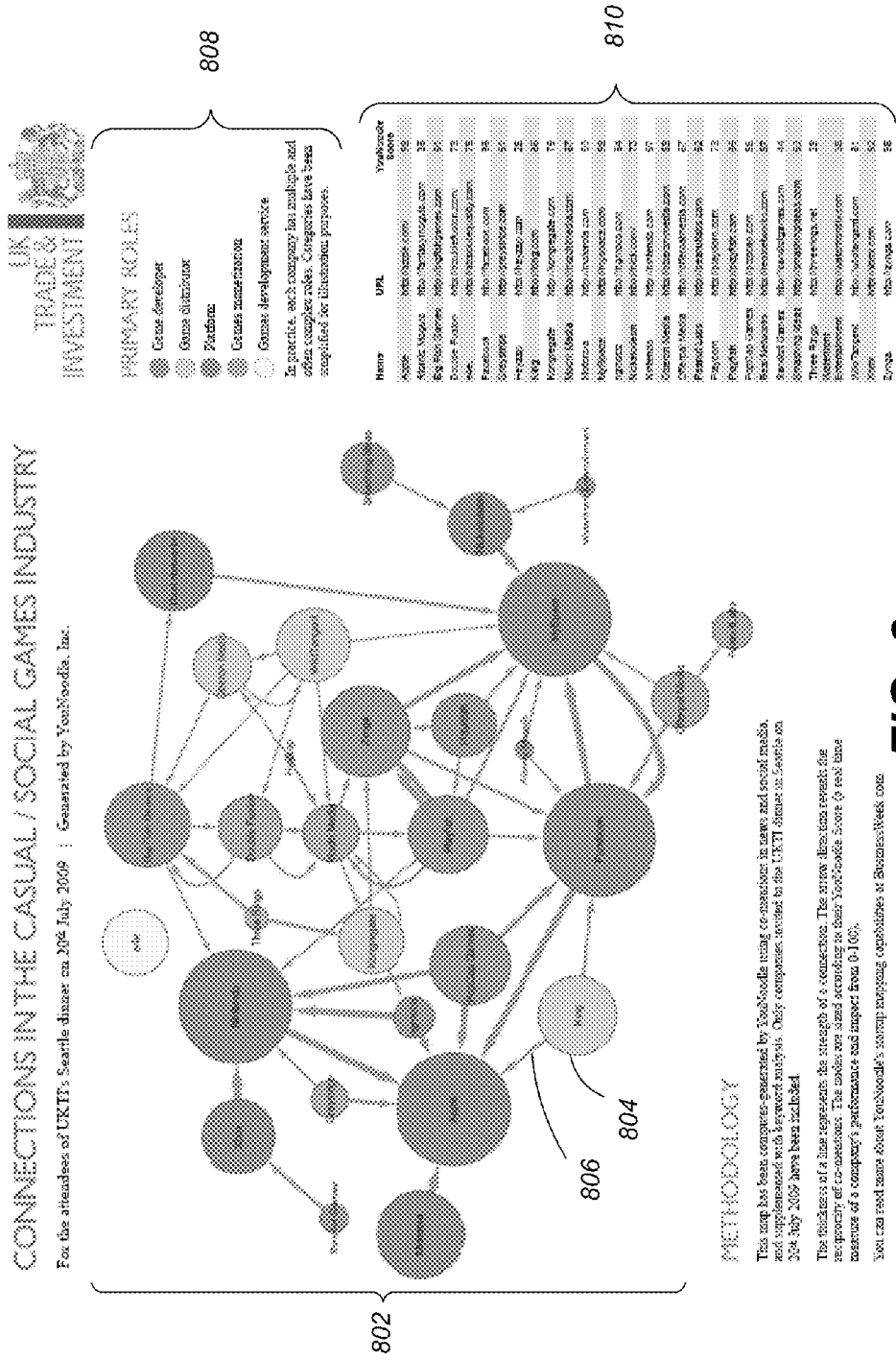
FIG. 8 illustrates one embodiment of a screenshot of a competitive landscape map application.

A competitive landscape is illustrated in FIG. 8, according to one embodiment. In a competitive landscape map 802, a node 804 represents an entity, and the size of the node is influenced, but not solely determined, by the node's performance score. The connection 806 between two nodes represents a relationship score between the nodes. As will be described in more detail below, a relationship score is generated by a process similar to the generation of a performance score, except that the relationship score involves at least two entities. Thus, where a media article co-mentions the two entities in the same article, a relationship between the two entities may be formed. In a competitive landscape map that illustrates an industry, such as the casual/social games industry in FIG. 8, different colors may be attributed to the different roles 808 within the industry. The performance scores of the entities 810 depicted in the competitive landscape map 802, along with the names and URLs of the entities, may also be displayed.

FIG. 8 depicts a screenshot of the competitive landscape map for a whole industry. In other embodiments, a competitive landscape map may be generated for nodes of the same relative size (e.g., performance score). Further, the connections between nodes have differing thicknesses and directionalities. The thickness of the depiction of the connection increases as the strength of connection increases. Likewise, the directionality, or the reciprocity (unilateral versus bilateral) of the connection influences the competitive relationship score. If the relevance of one company on the other is stronger (e.g. company A "matters more" to company B than vice versa), then the direction is more intense towards the second company (A→B). Company A may "matter more" to company B because company A may be mentioned in the same article every time that company B is mentioned, but company B is not always mentioned when company A is mentioned.

For example, suppose that company A is a well-established, later-stage startup. Company B may be an early-stage startup seeking to leverage the functionality provided by company A's product offerings to build a new product and/or service. In this respect, company A "matters more" to company B than vice versa because the new product and/or service is wholly dependent on company A. In comparison, company A doesn't really care about company B's success. As a result, the directionality of the connection would be from A to B and the connection would be fairly thick because of the intensity of the connection (i.e., company B relies heavily on company A). In this example, although company B relies completely on company A, such reliance is not necessary in determining the directionality of the connection. The number of "co-mentions" (i.e., the number of articles describing the two entities in the same article) is determinative of the directionality of the connection.

Figure 9:
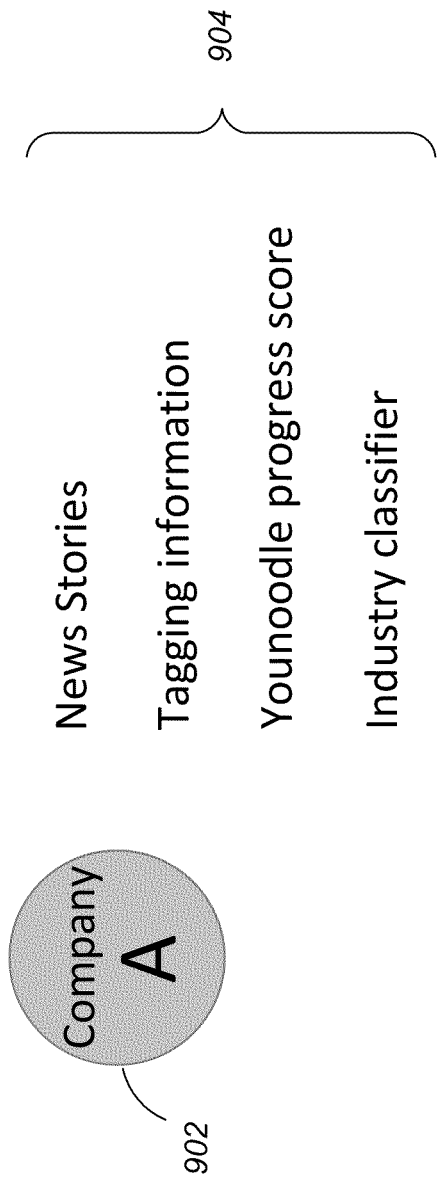
FIG. 9 illustrates one embodiment of a high-level block diagram of an entity and information about the entity.

Turning to FIGS. 9-14, the process of determining a relationship score between two entities is further described in phases, according to one embodiment. FIG. 9 depicts a node 902, company A, and its properties 904. These include news stories, tagging information, a performance score, and an industry classifier. As described above, nodes represent entities. News stories may comprise both mainstream media stories as well as social media stories, like blogs and twitter. An entity may also be "tagged" with metadata describing the entity, e.g., "social networking," "platform," "social games," "friends," etc. may be tags for various social networking websites. In one embodiment, a limited number of tags can be used (e.g., 30). The performance score has been described above and constantly changes as news stories are received about the entity. The node 902 also comprises an industry classifier, indicating the type of industry in which the entity operates, such as biotech, software development, or consumer internet.

Figure 10:
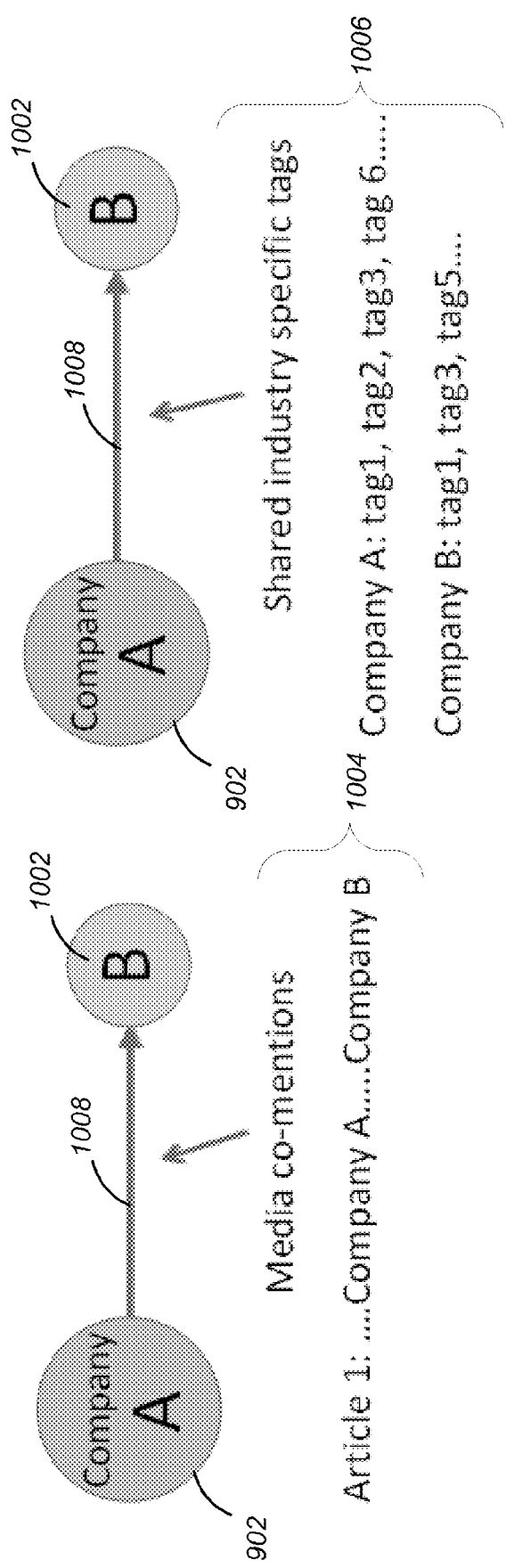
FIG. 10 illustrates one embodiment of a high-level block diagram of link formation between two entities.

In FIG. 10, high-level block diagrams depicting how links, or connections, are formed between two nodes. In the first diagram, node 902 forms a link 1008 with node 1002, representing company B, when an article co-mentions both company A and company B. This method of link formation may be described as a media co-mention 1004. The sum of all the number of co-mentions determines the strength of the relationship, or the relationship score (also referred to as a link score).

In the second diagram, node 902 forms a link 1008 with node 1002 because of shared industry specific tags, in one embodiment. This method of link formation may be described as a shared tag 1006. As described above, tags are metadata about the particular entity. Tags vary in specificity; a tag such as "web 2.0" is more generic than "micro processor design." The shared tag method of link formation 1006 may thus be customized by industry, in one embodiment. Regardless of how a link 1008 was formed, a relationship score, or link score, is generated between the two entities. The calculation of the link score is described further below.

FIG. 11 illustrates a series of steps to construct an initial network of competitive entities, according to one embodiment. News articles mentioning companies are collected 1102. The names in the articles are matched 1104 against an existing database of companies. False positives are removed 1106 from the news articles. A co-mention matrix is generated 1108 and centered around a single company A (or multiple companies). Tagging information for each company is collected 1110 and then combined 1112 with co-mention information to construct an initial relationship network for company A.

An advantage of matching 1104 the names of companies mentioned in the collected news articles 1102 against an existing database of companies is that the news articles are filtered to only those articles mentioning known entities, or companies. In one embodiment, a new node, or entity, may be created in the existing database based on at least one article mentioning the unknown entity in relation to at least one known entity. In another embodiment, a new node is created when a threshold number of articles are received with co-mentions of the unknown entity.

False positives are also removed 1106 from the news articles by methods already described above in the cleaning/filtering of media streams for use by the performance tracker. In addition, modifiers such as tagging information or other criteria, may be used to eliminate the false positives. For example, a user of a social networking website might post a link to a cleantech startup company on his blog. The co-mention of the social networking website and the cleantech startup company would be a false positive because, in this case, the social networking website is merely the vehicle by which the article was published. Modifiers may specifically exclude this situation from occurring, or tags such as "cleantech" would have eliminated the article as a co-mention news article because the social networking website would probably not have "cleantech" as a tag.

A co-mention matrix may be generated 1106 and centered around a single entity, as described in FIG. 11. The generated co-mention matrix would return the number of co-mentions between the single entity and each of the other entities in the news articles received. For example, if company A was the single entity around which a co-mention matrix is generated, then all of the news articles mentioning other entities along with company A, after the false positives have been removed, would be counted for each of the other entities.

Tagging information for each company in the co-mention matrix would be collected 1110 and then combined 1112 with the co-mention information to compute relationship scores, or link scores, for each company identified in the co-mention matrix. The tagging information may comprise information about whether two entities share tags, as described above. This tagging information, combined with numerous articles co-mentioning the two entities, would be combined to determine a high relationship score, as an example.

Figure 12:
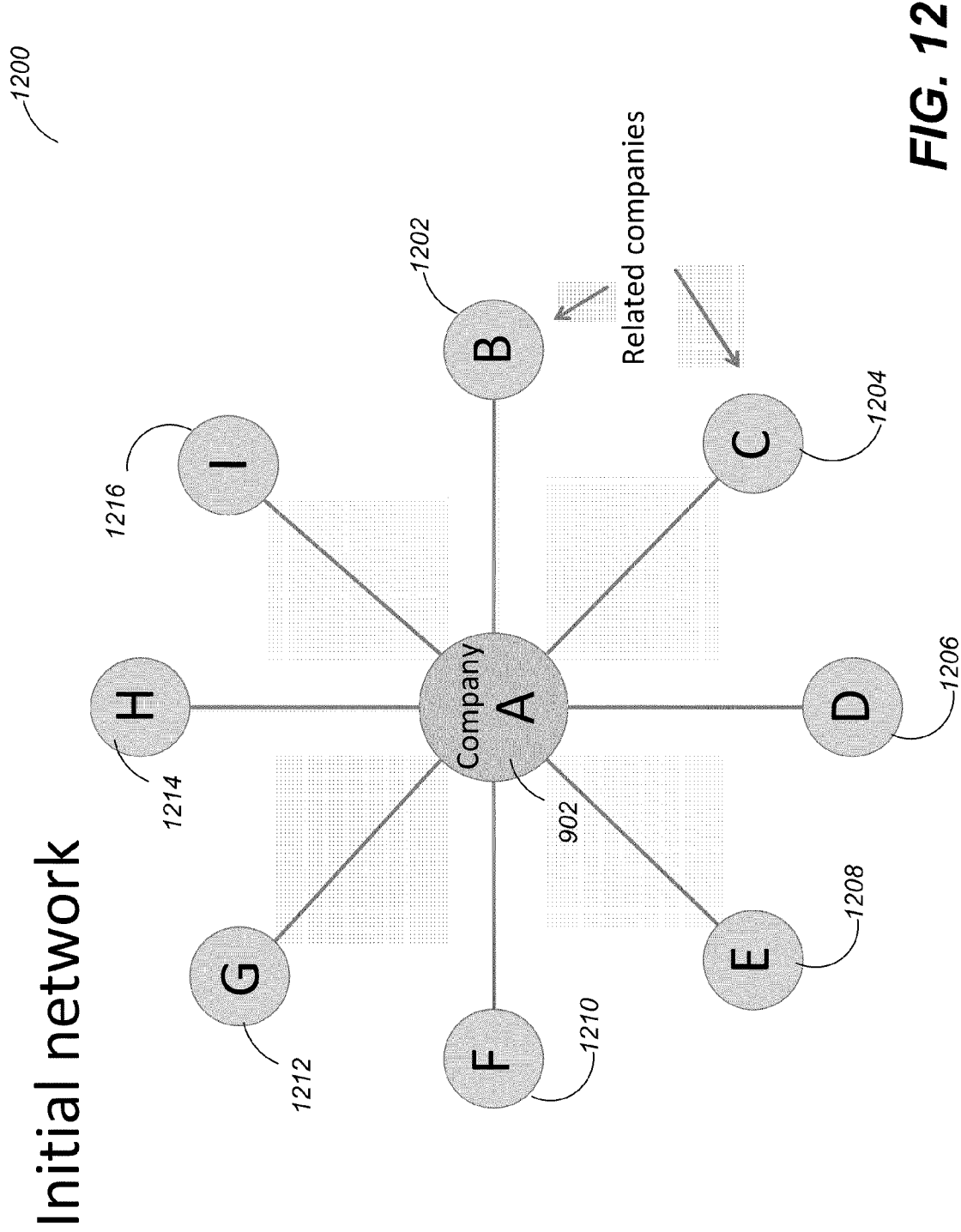
FIG. 12 illustrates one embodiment of a high-level block diagram of an initial network of entities.

FIG. 12 depicts an initial network 1200 of competitive entities, according to one embodiment. Node 902 is the single entity around which a co-mention matrix has been generated. Companies B-I, represented by nodes 1202-1216, have been at least co-mentioned with company A, represented by node 902, or share a tag with company A. Thus, the initial network 1200 provides useful information in that companies B-I are related to company A in some way. However, as the number of related companies increase, the less valuable this information becomes because the strongly related companies, i.e., major competitors, are lost in the crowd.

Link Relevance and Ranking of Connections

FIG. 13 depicts a high-level block diagram illustrating the types of information used to rank and filter the initial network of competitive entities, according to one embodiment. At the far left, node 902 is illustrated with a link to company B, represented by node 1202. A link score 1302 is generated based on a formula that weights multiple factors. These factors include the total number of co-mention articles 1306, the authority of each source 1308, the news similarity 1304, the node size 1316, the uniqueness of tag 1312, the tag cloud similarity 1314, the tagging score 1310, and the reciprocal nature (or directionality) of the link 1318 as described above. These factors are combined using a weighting formula to determine a link score 1302 between the two entities.

Because the competitive landscape map highlights relatively strong links between competitive entities, the link score 1302 is used as a threshold to filter competitive entities by rank and total link score 1320. If the link score 1302 meets or exceeds an absolute link score 1320, as calculated by the factors described above, then the link score 1302 will be displayed on the competitive landscape map and included in the cleaned network 1324. Thus, the question of whether to keep a link 1322 is applied to each of the entities in the initial network of competitive entities. As a result, a cleaned network 1324 is produced.

FIG. 14 depicts a cleaned network 1400 of competitive entities, in one embodiment. The node 902 representing company A is linked to only four nodes instead of the eight nodes in the initial network of FIG. 12. Links 1402-1408 exist based on rank, node size, tagging similarity, and reciprocal relationships, among other factors. Thus, a competitive landscape map of company A would only show nodes 1202, 1206, 1208, and 1212, representing companies B, D, E, and G.

Additional Configuration Considerations

Other entities for which public information is not widely available may benefit from the principles and processes described herein. For example, governments (local, state, national) may decide to measure the economic impact of their investments in businesses that support their community. Using a performance tracker mechanism similar to the model described above, governments, and even individuals, may collect data about their investments from various sources and track the performance of those businesses as it pertains to the specific economic impact felt by the community. Furthermore, the future performance of those businesses may also be predicted, thus enabling governments to manage their investments more efficiently. Similar scoring systems can be applied to measure the efficiency, performance and health of an entire ecosystem or cluster.

Another type of entity that receives investments, but for which public information is not widespread, is non-profit corporations and social enterprises. A charitable foundation, an individual, or socially minded venture capital may wish to track the performance of non-profits in terms of the numbers of people the non-profits serve, the impact felt in the community (local, state, national) due to the non-profits' work, a sense of the community reaction to a particular non-profit's work, and many other types of performance measures. A charitable foundation may use this information, and applications derived from the performance tracking data, to make charitable grant decisions. Peer-to-peer donations may be solicited by individuals wishing to help out non-profits and other individuals that make an impact in the community. Further, the charitable foundation may, based on the predicted future performance of non-profits, choose to fund the non-profits with the best predicted future performance. Additionally, grant seekers may be "matched" with foundations in a similar way that angel investors and VCs may be "matched" to early-stage startups in the social network platform described above.

Further, recruiting firms seeking people with an entrepreneurial spirit may utilize the information gathered and categorized by the performance tracker mechanism described above. Such information about people is not widely available and may be useful for recruiting firms that are targeted to reach out to these people. In a sense, the people that "catch the startup bug" are entities for which public information is not widely available. In one embodiment, a person's future performance may be predicted based on that person's current performance using predictive indicators gathered from a large database of data points. In this way, recruiting firms may selectively recruit the top talent with the highest predicted future performance.

In each of these additional configurations, the data sought about the entities exists, but is not publicly available and is not normalized into quantifiable data. The methods and mechanisms described above collect data about these entities, clean and normalize the data, and report the data in such a way to make the data meaningful. Moreover, the performance data calculated over time may be analyzed for patterns of predictive indicators. These predictive indicators may be used to predict the future performance of entities, including public companies, non-profits, social enterprises, early and late stage 'startups,' and entire ecosystems.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for measuring the performance of entities, particularly entities for which widespread public information is unavailable, through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for determining a competitive landscape for entities in an industry, the method comprising:
    tagging known entities with metadata;
    receiving media streams about a plurality of performing entities in the industry;
    authenticating the performing entities against the known entities;
    filtering the received media streams to eliminate false positives;
    scoring the filtered media streams;
    determining a performance score for each performing entity based on the authentication of the performing entities and the scored media streams;
    identifying for at least one of the plurality of performing entities, a link between the performing entity and a known entity, the identification based at least in part on the authentication of the performing entities against the known entities and the performance score for the at least one performing entity;
    determining a relationship score for the identified link based on the performance score determined for the at least one performing entity and the scored media streams, each relationship score describing a relationship between a performing entity and a known entity; and
    reporting a competitive landscape map for the performing entities based on the relationship scores.

2. The method of claim 1 further comprising:
    authenticating competitive entities against the metadata of the known entities.

3. The method of claim 2, further comprising:
    extracting term vectors from text mentioning the entities.

4. The method of claim 2, further comprising:
    determining a connection between at least two competitors created in response to a received media article mentioning the competitors.

5. The method of claim 1, further comprising:
    determining an identification of an entity based on a link between the entity and the known entities within the competitive landscape map, the link based on the filtered media streams.

6. A non-transitory computer readable storage medium having instructions stored thereon, the instructions when executed by at least one processor cause the processor to:
    tag known entities with metadata;
    receive media streams about a plurality of performing entities in the industry;
    authenticate the performing entities against the known entities;
    filter the received media streams to eliminate false positives;
    score the filtered media streams;
    determine a performance score for each performing entity based on the authentication of performing entities and the scored media streams;

identify for at least one of the plurality of performing entities, a link between the performing entity and a known entity, the identification based at least in part on the authentication of the performing entities against the known entities and the performance score for the at least one performing entity;

determine a relationship score for the identified link based on the performance score determined for the at least one performing entity and the scored media streams, each relationship score describing a relationship between a performing entity and a known entity; and report a competitive landscape map for the performing entities based on the relationship scores.

7. The computer readable storage medium of claim 6, further comprising instructions that when executed cause the processor to:

authenticate competitive entities against the metadata of the known entities.

8. The computer readable storage medium of claim 7, further comprising instructions that when executed cause the processor to:

determine a connection between at least two competitors created in response to a received media article mentioning the competitors.

9. The computer readable storage medium of claim 6, further comprising instructions that when executed cause the processor to:

determine an identification of an entity based on a link between the entity and the known entities within the competitive landscape map, the link based on the filtered media streams.

\* \* \* \* \*